United States Patent [19]
Freed et al.

[11] 3,869,512
[45] Mar. 4, 1975

[54] DIBENZOBICYCLOALKANE AMINES AND RELATED COMPOUNDS

[75] Inventors: Elisabeth H. Freed; Meier E. Freed, both of Paoli; John R. Potoski, Spring City, all of Pa.

[73] Assignee: American Home Products Corporation, New York, N.Y.

[22] Filed: Feb. 20, 1973

[21] Appl. No.: 333,814

[52] U.S. Cl. ............. 260/571, 260/476 C, 260/477, 260/479 R, 260/566 R, 260/566 A, 260/576, 260/578, 260/590, 424/330
[51] Int. Cl. C07c 91/42, C07c 93/14, C07c 119/14, C07c 131/00, C07c 49/76
[58] Field of Search ............................ 260/578, 571

[56] References Cited
UNITED STATES PATENTS

| | | | |
|---|---|---|---|
| 3,716,541 | 2/1973 | Dobson et al. | 260/578 X |
| 3,836,670 | 9/1974 | Freed et al. | 260/571 |

*Primary Examiner*—Elbert L. Roberts
*Assistant Examiner*—S. P. Williams
*Attorney, Agent, or Firm*—Royal E. Bright; Robert Wiser

[57] ABSTRACT

Dibenzobicycloalkane amines, their pharmacologically acceptable addition salts, intermediates for their preparation, and process for their use. The compounds of the invention exert analgesic activity.

9 Claims, 1 Drawing Figure

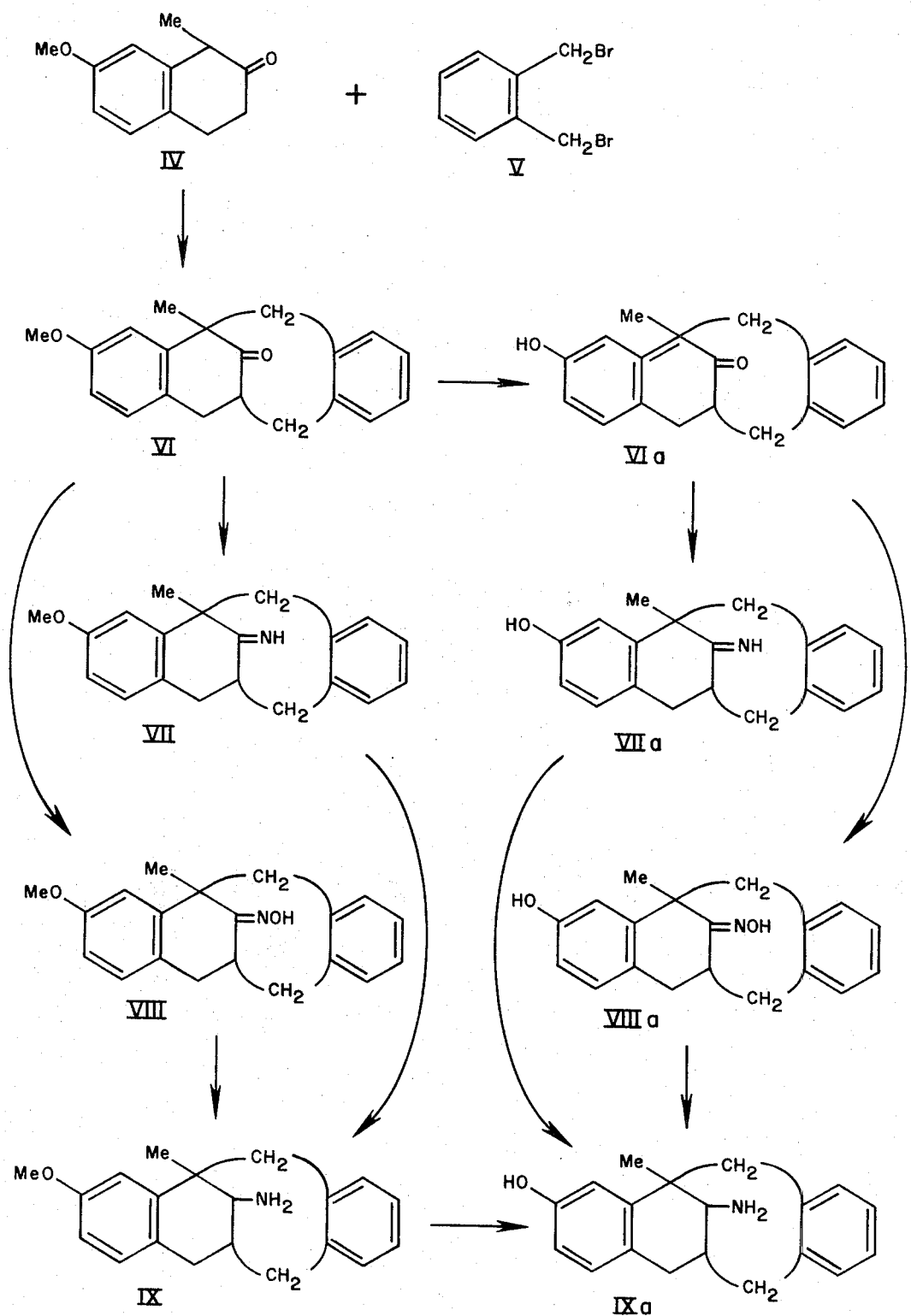
FIGURE A

DIBENZOBICYCLOALKANE AMINES AND RELATED COMPOUNDS

BACKGROUND OF THE INVENTION

This invention relates to compositions of matter classified in the art of chemistry as amine derivatives of 5,-12-methano-dibenzo[a,e]cyclononane, 5,13-methano-dibenzo [a,e]cyclodecane, or 5,14-methano-dibenzo[a,f]cycloundecane, and the non-toxic addition salts thereof, which in standard pharmacological tests in animals exhibit analgesic activity, and to processes for using such compositions.

SUMMARY OF THE INVENTION

The invention sought to be patented in a principle composition of matter aspect resides in the concept of a chemical compound of Formula I.

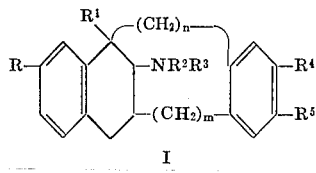

wherein R is hydrogen, hydroxy, lower alkyloxy, phen(-lower)-alkyloxy, lower alkanoyloxy, phen(lower)alkanoyloxy, carbocyclic aroyloxy, halo, or trifluoromethyl; $R^1$ is alkyl of from 1 to 3 carbon atoms, lower alkenyl, or lower alkynyl; $R^2$ is hydrogen, or lower alkyl; $R^3$ is hydrogen, lower alkyl, lower alkenyl, or lower alkynyl; $R^4$ and $R^5$ are identical and are hydrogen, hydroxy, lower alkyloxy, phen(lower)alkyloxy, lower alkanoyloxy, phen(lower)alkanoyloxy, carbocyclic aroyloxy, or halo; or one of $R^4$ and $R^5$ is hydrogen and the other is hydroxy, lower alkyloxy, phen(lower)alkyloxy, lower alkanoyloxy, phen(lower)alkanoyloxy, carbocyclic aroyloxy, halo, or trifluoromethyl; m is the integer 1 or 2; and n is the integer 1 or 2, with the proviso that when m is 1, n is 1; and pharmaceutically non-toxic addition salts thereof.

The tangible embodiments of the composition aspect of the invention possess the inherent general physical properties in the acid salt form of being high melting, white crystalline solids, substantially soluble in water and polar organic solvents such as lower aliphatic alcohols and the like, Examination of the compounds produced according to the hereinafter described process reveals upon infrared and nuclear magnetic resonance spectrographic analysis, infrared and nuclear magnetic resonance spectral data confirming the molecular structure hereinbefore set forth. The aforementioned physical characteristics taken together with the microanalytical data, the nature of the starting materials, and the mode of synthesis positively confirm the structures of the compositions sought to be patented.

The tangible embodiments of the principal composition aspect of the invention possess the inherent applied use characteristic of exerting an analgesic effect as evidenced by standard pharmacological tests.

The invention sought to be patented in a first subgeneric composition aspect resides in the concept of a chemical compound of Formula I wherein m and n are 1.

The invention sought to be patented in a second subgeneric composition aspect resides in the concept of a chemical compound of Formula I wherein n is 1 and m is 2.

The invention sought to be patented in a third subgeneric composition aspect is described as residing in the concept of a chemicl compound of Formula I wherein m and n are 2.

The invention sought to be patented in a second principal composition aspect resides in the concept of a chemical compound of the Formula II

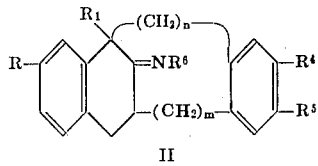

wherein R, $R^1$, $R^4$, $R^5$, n and m are as hereinbefore defined, and $R^6$ is hydrogen, hydroxy, lower alkyl, or lower alkyloxy.

The tangible embodiments of the second principal composition aspect of the invention possess the inherent general physical characteristics of being insoluble in water but soluble at elevated temperatures in polar organic solvents such as lower aliphatic alcohols and the like.

Examination of the compounds produced according to the hereinafter described process reveals upon infrared and nuclear magnetic resonance spectrographic analysis, infrared and nuclear magnetic resonance spectral data confirming the molecular structure hereinbefore set forth. The physical characteristics, taken together with the nature of the starting materials and the mode of synthesis positively confirm the structure of the compositions sought to be patented.

The tangible embodiments of the second principal composition aspect of the invention possess the inherent applied use characteristic of being intermediates in the preparation of the amines of Formula I.

The invention sought to be patented in a third principal composition of matter aspect resides in the concept of a chemical compound of the Formula III:

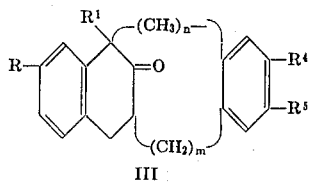

wherein R, $R^1$, $R^2$, $R^3$, $R^4$, $R^5$, m and n are as hereinbefore defined.

The tangible embodiments of the third principle composition aspect of the invention possess the inherent general physical characteristics of being crystalline solids, which are substantially insoluble in water but are soluble in common organic solvents such as di(lower)-alkyl ethers, di(lower)alkyl ketones, lower aliphatic alcohols, chloroform and the like. Examination of the compounds produced according to the hereinafter described process reveals upon infrared and nuclear magnetic resonance spectrographic analysis, infrared and nuclear magnetic resonance spectral data confirming the molecular structure hereinbefore set forth. The physical characteristics taken together with the nature of the starting materials and the mode of synthesis positively confirm the structure of the compositions sought to be patented.

The tangible embodiments of the third composition aspect of the invention possess the inherent applied use characteristic of being intermediates for the preparation of the amines of Formula I.

The invention sought to be patented in a principal process aspect is described as residing in the concept of a process for inducing analgesia in warm-blooded animals by administering to warm-blooded animals, a pharmaceutically effective dose of a compound of Formula I.

DESCRIPTION OF THE PREFERRED EMBODIMENT

In describing the processes for the preparation of the specific embodiments of the invention, reference will be made to FIG. A wherein the compounds are assigned Roman numerals for identification schematically, and wherein is illustrated schematically the reaction sequence for preparing specific primary amine embodiments of Formula I, namely 6, 11,12, 13-tetrahydro-3-methoxy-5-methyl-5,12-methano-5H-dibenzo-[a,e]cyclononen-14-amine (IX), and 6,11,12,-13-tetrahydro-3-hydroxy-5-methyl-5,12-methano-5H-dibenzo[a,e]cyclononen-14-amine(IXa); specific embodiments of Formula II, namely 6,11,12,13-tetrahydro-3-methoxy-5-methyl-5,12-methano-5H-dibenzo-[a,e]cyclononen-14 -imine(VIIa), 6,11,12,13-tetrahydro-35-methyl-5,12-methano-5H-dibenzo[a,e]cyclononen-14-imine(VIIa), 6,11,12,13-tetrahydro-3-methoxy-5-methyl-5,12-methano-5H-dibenzo[a,e]cyclononen-14-one, oxime(VIII), and 6,1-1,12,13-tetrahydro-3-hydroxy-5-methyl-5,12-methano-5H-dibenzo-[a,e]cyclononen-14-one, oxime(VIIIa); and specific embodiments of Formula III, namely 6,11,12,13-tetrahydro-3-methoxy-5-methyl-5,12-methano-5H-dibenzo[a,e]cyclononen-14-one(VI) and 6,11,12,13-tetrahydro-3-hydroxy-5-methyl-5,12-methano-5H-dibenzo[a,e]cyclononen-14-one(VIa).

Referring now to FIG. A, the first step in preparing the aforementioned embodiments in the addition of 1-methyl-7-methoxy-2-tetralone (IV) to a solution or suspension of an approximately 1.1 molar amount of a strong base such as potassium t-butoxide in t-butanol followed by stirring for a brief period, conveniently 1 hour. Ortho-xylyldibromide (V) is then added, and the mixture stirred for an extended period of time, conveniently 20 hours. Additional strong base is then added and stirring continued for an additional extended period, conveniently 60 hours, to produce compound VI. Compound VI, if desired, may be hydrolyzed by standard methods, such as treatment with hydrobromic acid, to produce compounds VIa, or it may be used as an intermediate to produce the oxime VIII or the imine VII: In order to prepare the oxime VIII, compound VI is treated with hydroxylamine under basic conditions. The oxime VIIIa may also be prepared in a similar fashion from the ketone VIa. To prepare the imine VII the ketone VI is treated with ammonia in a sealed vessel at elevated temperatures in the presence of a water absorber such as calcium oxide. The imine VIIa may be prepared directly from the ketone VIa by an analogous reaction. Compound IX may, of course, be prepared from either compound VII or VIII by standard reduction methods. Conveniently, the oxime VIII may be reduced by treatment with hydrogen at moderate pressure, preferably 40–50 p.s.i., in the presence of Raney nickel, and ammonium hydroxide; by treatment with the hydride reducing agents, such as lithium aluminum hydride; by treatment with diborane at elevated temperature; or by treatment with an alkali metal, preferably sodium, in an alkanol, for example ethanol or isopropanol. Conveniently, the imine VII may be reduced by treatment with hydrogen at moderate pressure, preferably 40–50 p.s.i., in the presence of a catalyst, preferably platinum oxide; by treatment with the hydride reducing agents, for example lithium aluminum hydride, or sodium borohydride; by treatment with diborane at elevated temperature; or by treatment with an alkali metal, preferably sodium, in an alkanol, for example ethanol or isopropanol. Compound IXa can similarly be prepared from compounds VIIa, or VIIIa by analogous reactions, or it may be prepared from compound IX by hydrolyzing with hydrobromic acid.

While the process of the invention has been described with reference to the figure which illustrates its application to the preparation of 6,11,12,13-tetrahydro-3-methoxy-5-methyl-5,12-methano-5H-dibenzo[a,e]cyclononen-14 -amine(IX), and 6,11,12,-13-tetrahydro-3-hydroxy-5-methyl-5,12-methano-5H-dibenzo[a,e]-cyclononen-14-amine(IVa), it will be obvious to one skilled in the art that the process will be equally applicable to tetralones and to ω,ω'-dihalo-o-dialkyl-benzenes bearing the various substituents and alkyl chain lengths contemplated with the scope of the invention. Similarly it will be obvious to prepare, through the use of standard methods, the variously substituted amines, imines and alkoximines contemplated to be within the scope of the invention. For example, treatment of ketones of Formula VIa with lower alkyl primary and secondary amines in a reaction similar to that described for the preparation of the imines VII and VIIa will produce analogous alkyl substituted imines which may then be reduced to produce N-lower alkyl embodiments of Formula I. Similarly the ketones of Formula III may be treated with lower alkoxy amines in a fashion similar to that described for the preparation of the oximes VIII or VIIIa. These alkoximes may then be reduced in a fashion similar to that described for the reduction of the oximes VIII and VIIIa to produce primary amine embodiments of Formula I. The preparation of tertiary and other secondary amine embodiments of Formula I from the primary and secondary amine embodiments of Formula I prepared by the aforedescribed processes may be accomplished by treating the appropriate primary or secondary amine of Formula I with an appropriate lower alkyl, lower alkenyl, or lower alkynyl halide; by treating the primary or secondary amine of Formula I with an appropriate acyl halide, and reducing the resulting amide, or an especially convenient way of introducing methyl substituents is to treat a primary or secondary amine of Formula I with a haloformate ester and reduce the resulting urethane.

The starting materials for the practice of the invention, namely the above-mentioned variously substituted 1-lower-alkyl-1-lower alkenyl-, or 1-lower alkynyl-2-tetralones, and variously substituted ω,ω'-dihalo-o-dialkyl-benzenes are readily available.

The tetralones may be prepared from commercially available or readily synthesizable 2-tetralones by a well-known alkylation reaction as typically described by Stork et al. in the Journal of the American Chemical Society, 84, 284, (1962). The tetralones are treated with pyrrolidine in an inert solvent such as benzene, and then reacted with the appropriate lower alkyl, lower alkenyl, or lower alkynyl halide in an inert solvent, such as benzene or dioxane, at elevated temperatures, conveniently the reflux temperature of the solvent employed. They may also be prepared from a suitable commercially available or readily synthesized 1-tetralone by treating, as described by Howell, et al., in the *Journal of the Chemical Society*, 1968, 1249, with a Grignard reagent, prepared from the appropriate lower alkyl-, lower alkenyl-, or lower alkynyl-halide, and oxidizing the resulting 1-substituted dihydronaphthalene with peracid.

Syntheses of non-commercially available tetralones are readily available in the literature, e.g., the synthesis of α-tetralone is described in Organic Synthesis, collective Volume IV, page 898; the synthesis of β-tetralone is described in the same work on page 903; and a general synthesis of α-tetralones is described in Nagata, et al., Netherlands Pat. No. 67,09534, Jan. 10, 1968.

The variously substituted ω,ω'-dihalo-o-dialkylbenzenes are obtainable in similar fashion. o-Xylyldibromide is commercially available. Synthesis of other o-xylyldihalides are given in the literature or may be readily adapted from those methods. For example, the synthesis of 1,2-bis(bromomethyl)-4,5-dimethoxybenzene starting from 3,4-dimethoxy benzoic acid is shown by Taylor, et al., in the *Journal of Medicinal Chemistry*, Vol. 13, page 1226, (1970). In this synthesis 3,4-dimethoxy benzoic acid is condensed with formaldehyde in the presence of acid to produce 5,6-dimethoxya phthalide. Reduction of this compound by standard means produces 1,2-bis(hydroxymethyl)-4,5-dimethoxybenzene. Treatment of this dihydroxy compound with $PBr_3$ produces the desired 1,2-bis(bromomethyl)-4,5-dimethoxybenzene. The ω,ω'-dihalo-diethylbenzene may be prepared by chain extension of the corresponding dimethylhalides. For example, the Taylor, et al., paper described hereinabove describes the conversion of 1,2-bis(bromomethyl)-4,5-dimethoxybenzene to 1,2-bis(carbethoxymethyl)-4,5-dimethoxy benzene. This is accomplished by conversion to the dinitrile by treating the bromo compound with sodium cyanide followed by acidic alcoholysis. This diester can then be converted to the diethyl bromide by reduction and bromination as described for the dimethyl compound. A synthesis suitable for the preparation of o-halomethyl-β-haloethylbenzenes is described by Oelschlager et al. in *Arzneimittel Forschung*, Vol. 22, page 1013, (1972). 2-hydroxy-ethylbenzene is treated with formaldehyde in acid to form isochromane. Treatment with HBr produces the desired dibromide. It will be obvious to those skilled in the art that the above-described syntheses are adaptable to produce from commercially available appropriate starting materials the various ω,ω'-dihalo-dialkyl-benzenes required for the practice of the invention.

The analgesic activity of the tangible embodiments can be elicited by following a modification of the test procedure described by D Amour and Smith in the *Journal of Pharmacology*, Vol. 72, page 74, (1941), an accepted test for analgesic agents. In this test rats are administered the compound orally, intraperitoneally, or intramuscularly, and the time required for response to a pain stimulus caused by a high intensity beam of light shining on the tail measured. The tangible embodiments of the invention exhibit analgesic activity in rats at a dose of from 12.5 to 25 mg. per kg. of body weight intraperitoneally.

The dosage employed upon administration of the tangible embodiments of the invention will vary with the form of administration and the particular compound chosen. Furthermore, it will vary with the particular subject under treatment. Generally treatment is initiated with small dosages substantially less than the optimum dose of the command. Thereafter the dosage is increased until the optimum effect under the circumstances is reached. In general, the tangible embodiments of the invention are most desirably administered at a concentration level that will generally afford effective results without causing any harmful or deleterious side effects.

As used herein the term "lower alkyl" means a saturated hydrocarbon radical, including straight and branched radicals having from 1 to 6 carbon atoms, among which are for the purposes of illustration, but without limiting the generality of the foregoing, methyl, ethyl, n-propyl, i-propyl, t-butyl, isopentyl, and n-hexyl. The term "lower alkenyl" means an unsaturated hydrocarbon radical, including straight and branched radicals having from 3 to 5 carbon atoms, among which are for purposes of illustration, but without limiting the generalilty of the foregoing, allyl, 2-butenyl, 2-methyl-2-butenyl, and 2-pentenyl. The term "lower alkynyl" means an unsaturated hydrocarbon radical, containing a triple bond, including straight and branched radicals, having from 3 to 6 carbon atoms, among which are for the purposes of illustration, but without limiting the generality of the foregoing, 3-propynyl, 2-butynyl, and 3-methyl-1-butyn-4-yl. The term "phen(lower)alkyl" means a lower alkyl radical, as defined hereinabove, substituted in a terminal position by a phenyl or a phenyl radical substituted by lower alkyl or lower alkyloxy, among which are for the purposes of illustration, but without limiting the generality of the foregoing, benzyl, phenethyl, p-anisyl, m-cumenyl, veratryl, or o-xylyl. The term "halo" means fluoro, chloro, or bromo.

It will be obvious to one skilled in the art of chemistry that the ketones of Formula III will be produced as racemic mixtures, and that reduction of oximes or imines of Formula II will yield the amines of Formula I as diastereomers. The separation of the diastereomeric pairs and their resolution into enantiomers, if desired, may be accomplished by well-known procedures. The diastereomers, enantiomers and mixtures thereof are all included within the scope of this invention.

It is convenient in the present application to distinguish pairs of diastereomers by specifying the orientation of the amino group. A number of conventional systems of nomenclature for specifying the orientation are suitable, and selection of a particular system is a matter of convenience. Because of its greater specificity and more general applicability, a system enabling specification of the relative orientation of all substituents on the tetralin ring system has been adopted for use in this application. In this system the tetralin ring is projected on a plane. Those substituents extending below the plane are designated α, and those extending above the plane are designated β.

The following examples further illustrate the best mode contemplated by the inventors for carrying out the invention.

EXAMPLE I 6,11,12,13-Tetrahydro-3-Methoxy-5-Methyl-5,12-Methano-5H-Dibenzo[a,e]Cyclononen-14-One To a solution of t-potassium butoxide (from 4.3 g. of potassium) in 100 ml. of dry t-butanol, stirred under nitrogen, is added a solution of 1-methyl-7-methoxy-2-tetralone (19.1 g., 0.1 mole) in 150 ml. dry t-butanol. Stirred 1 hour at room temperature.

This solution is then added to a solution of O-xylyldibromide (39.5 g., 0.15 mole) in 300 ml. t-butanol, and stirred under nitrogen for 20 hours. To this suspension is added dropwise a solution of potassium t-butoxide (12 g.) in 100 ml. of dry t-butanol. After stirring at 27° for 60 hours (under nitrogen), the suspension is concentrated under a vacuum, poured into cold water (500 ml.), and extracted with ether (3 × 100 ml. ether). The insoluble material is filtered off, washed well with water, and dried. Crystallization from cyclohexane gives a product, 5.8 g., m.p. 138°–40°.

The ether extract is washed with saline, dried, and concentrated. The residue is crystallized from cyclohexane, yielding an additional 7.2 g. of product, m.p. 134°–37°. Total yield: 13 g. (44.8%).

Analysis for: $C_{20}H_{20}O_2$
Calculated: C, 82.15; H, 6.89
Found: C, 82.26; H, 7.01.

EXAMPLE II 6,11,12,13-Tetrahydro-3-Methoxy-5-Methyl-5,12-Methano-5H-Dibenzo[a,e]Cyclononen-14-One,Oxime A mixture of 7 g. of 6,11,12,13-tetrahydro-3-methoxy-5-methyl-5,12-methano-5H-dibenzo[a,e]cyclononen-14-one, 15 g. hydroxylamine hydrochloride, and 80 ml. of dry pyridine is refluxed for 20 hours. After cooling the solvent is removed under vacuum. The residue is stirred with cold water, and acidified to pH <2 with concentrated hydrochloric acid. The solid oxime is washed with water and dried to give 7.4 g. of product, m.p. 188°–90°.

Analysis for: $C_{20}H_{21}NO_2$
Calculated: C, 78.14; H, 6.89; N, 4.56
Found: C, 78.29; H, 7.05; N, 4.50.

EXAMPLE III 6,11,12,13-Tetrahydro-3-Methoxy-5-Methyl-5,12-Methano-5H-Dibenzo[a,e]Cyclononen-14-Amine A mixture of 6,11,12,13-tetrahydro-3-methoxy-5-methyl-5,12-methano-5H-dibenzo[2,e]cyclononen-14-one, oxime, 5.25 g., 25 g. of washed Raney Nickel (WR Grace, No. 28), 25 ml. of concentrated ammonium hydroxide, and 100 ml. of absolute ethanol is shaken under hydrogen (at 45 psi) in a Parr Hydrogenation apparatus until hydrogen uptake ceases. The catalyst is removed by filtration and washed with ethanol, under a nitrogen atmosphere. The filtrate is concentrated to an oil, and dissolved in ether. The cloudy solution is passed through a mixture of filter cell and anhydrous sodium sulfate. The clear filtrate is treated with dry hydrogen chloride yielding 4.5 g. of crude product as hydrochloride. Crystallization from 75 ml. of hot water gives white crystals, 2.5 g., m.p. 314°–315°.

Analysis for: $C_{20}H_{24}ClNO \cdot 1/2H_2O$
Calculated: C, 70.80; H, 7.44; N, 4.16; Cl, 10.47
Found: C, 70.57; H, 7.41; N, 4.05; Cl, 10.50.

EXAMPLE IV 6,11,12,13-Tetrahydro-3-Methoxy-5-Methyl-5,12-Methano-5H-Dibenzo[a,e]Cyclononene-14-Amine (α and β Epimers)

A mixture of 25 g. (0.08 mole) of 6,11,12,13-tetrahydro-3-methoxy-5-methyl-5,12-methano-5H-dibenzo[a,e]cyclononen-14-one, oxime, 50 g. of Raney Nickel catalyst, 50 ml. concentrated ammonium hydroxide, and ethanol (250 ml.) are placed in a Parr hydrogenation apparatus and shaken with hydrogen at 15 psi. After hydrogen uptake ceases the reduction mixture is removed from the apparatus, filtered, and concentrated. The concentrate is taken up in ether (dry) and treated with gaseous hydrogen chloride. The crystalline salt is filtered off, washed, and dried. Crude yield: 20 g. The mixture of hydrochlorides is dissolved in 400 ml. water and 150 ml. of methanol. Concentrated aqueous hydrogen chloride (5 ml.) is added and the solution concentrated to a volume of 400 ml. After cooling, white crystals separate and are filtered, washed with acidified water, then with cold water, and dried to give 11.5 g., m.p. 312°–14° (β epimer). The filtrate is concentrated to 150 ml., allowed to stand overnight. The precipitate which forms is filtered off, washed with a small amount of ice-cold water, and dried to give a product 6.2 g. Recrystallization of a sample from methanol-acetonitrile (1:3) gives α-epimer, m.p. 298°–299°.

EXAMPLE V 6.11,12,13-Tetrahydro-3-Hydroxy-5α-Methyl-5,12-Methano-5H-Dibenzo[a,e]Cyclononen-14β-Amine 6,11,12,13-Tetrahydro-3-methoxy-5α-methyl-5,12-methano-5H-dibenzo[a,e]cyclononene-14β-amine (3 g.) is heated under reflux in 60 ml. of 48% aqueous hydrobromic acid for 1 hour (under nitrogen). The reaction is cooled, and poured into 50 g. ice, and the precipitate filtered, water washed, and dried. The solid is dissolved in 150 ml. warm water, the solution clarified by filtration and the filtrate treated with 5% sodium bicarbonate to pH 7.5–8. A white solid separates and is filtered off, washed and dried. (Zwitterion, m.p. 228°–230°).

Analysis for: $C_{19}H_{21}NO \cdot H_2O$
Calculated: C, 76.73; H, 7.80; N, 4.71
Found: C, 76.04; H, 7.37; N, 4.51.

The inner salt (0.83 g.) is suspended in 50 ml. $H_2O$, and concentrated hydrochloric acid is added to pH 1. The suspension is warmed until a clear solution is obtained, filtered, and cooled. A crystalline hydrochloride separates, 0.65 g. (m.p. 345°–347°, dec).

Analysis for: $C_{19}H_{22}NClO \cdot 1/2H_2O$
Calculated: C, 70.40; H, 7.14; N, 4.32; Cl, 10.92
Found: C, 70.74; H, 7.02; N, 4.37; Cl, 11.49.

EXAMPLE VI 6,11,12,13-Tetrahydro-3-Methoxy-N,5α-Dimethyl-[5,12]-Methano-5H-Dibenzo[a,e]Cyclononen-14β-Amine Ethyl chloroformate (10.86 g.) in methylene chloride (20 ml.) is added slowly to a stirred mixture of saturated sodium bicarbonate solution (100 ml.), 6,11,12,-13-tetrahydro-3-methoxy-5α-methyl[5,12]methano-5H-dibenzo[a,e]cyclononen-14β-amine (10.5 g.) and methylene chloride (230 ml.). The reaction is stirred for 1 hour after evolution of carbon dioxide ceases. The phases are then separated. The methylene chloride phase is then washed with dilute hydrochloric acid, saturated saline, and dried for a short period of time over magnesium sulfate, filtered and concentrated to a residue.

The residue is dissolved in dry tetrahydrofuran (50 ml.) and added dropwise to a stirred suspension of lithium aluminum hydride (7.6 g.) in dry tetrahydrofuran (250 ml.). After refluxing for 24 hours the mixture is cooled, water (25 ml.) is added. The resulting mixture is filtered and the filtercake washed thoroughly with 2-propanol in tetrahydrofuran. The wash is separated from the residual filtercake by filtration and the combined filtrates are concentrated in vacuo. The oil which results is redissolved in ether, filtered, and the filtrate adjusted to a volume of 100 ml. Dry hydrogen chloride is passed into the ether solution. The precipitate which separates is filtered and dried, 1.4 g. m.p. 255°–260°, on standing the ethereal solution yields a second crop of crystals 8.0 g.

Recrystallization of a portion of the first crop of material from hot water gives the title product as its hydrochloride salt m.p. 265°–268°.

Analysis for: $C_{21}H_{26}ClNO$
Calculated: C, 73.33; H, 7.64; N, 4.07; Cl, 10.31
Found: C, 72.94; H. 7.74; n, 4.03;cl, 10.33.

EXAMPLE VII 6,11,12,13-Tetrahydro-3-Methoxy-N,N,5α-Trimethyl[5,12]Methano-5H-Dibenzo[a,e]Cyclononen-14β-Amine Following a procedure analogous to that described in Example VI for the preparation of 6,11,12,13-tetrahydro-3-methoxy-N,5α-dimethyl[5,12]methano-5H-dibenzo[a,e]cyclononen-14β-amine there is obtained from 6,11,12,13-tetrahydro-3-methoxy-N,5α-dimethyl[5,12]methano-5H-dibenzo[a,e]cyclononen-14β-amine (8.0 g.), 7.0 g. of crude 6,11,12,13-tetrahydro-3-methoxy-N,N,5α-trimethyl[5,12]methano-5H-dibenzo[a,e]cyclononen-14β-amine which is recrystallized from ether-pentane to give the title product m.p. 146°–148°.

The hydrochloride salt is analyzed.
Analysis for: $C_{22}H_{28}ClN$
Calculated: C, 73.82; H, 7.88; H, 3.91; Cl, 9.91

Found: C, 73.46; H, 8.14; N, 3.69; Cl, 9.77.

The subject matter which the applicants regard as their invention is particularly pointed out and claimed as follows:

1. A compound of the formula:

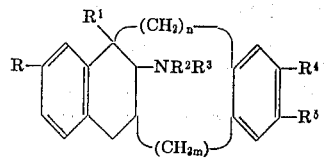

wherein R is hydrogen, hydroxy, lower alkyloxy, phenyl lower alkyloxy, lower alkyl phenyl lower alkyloxy, lower alkyloxy phenyl lower alkyloxy, halo, or trifluoromethyl; $R^1$ is lower alkyl of from 1 to 3 carbon atoms, lower alkenyl, or lower alkynyl; $R^2$ is hydrogen or lower alkyl; $R^3$ is hydrogen, lower alkyl, lower alkenyl, or lower alkynyl; $R^4$ and $R^5$ are identical and are hydrogen, hydroxy, lower alkyloxy, phenyl lower alkyloxy, lower alkyl phenyl lower alkyloxy, lower alkyloxy phenyl lower alkyl, or halo; or one of $R^4$ and $R^5$ is hydrogen and the other is hydroxy, lower alkyloxy, phenyl lower alkyloxy, lower alkyl phenyl lower alkyloxy, lower alkyloxy phenyl lower alkyloxy, halo, or trifluoromthyl; $m$ is the integer 1 or 2; and $n$ is the integer 1 or 2 with the proviso that when $m$ is 1, $n$ is 1; and the pharmaceutically non-toxic addition salts thereof.

2. A compound as defined in claim 1, wherein $n$ and $m$ are 1.

3. A compound as defined in claim 1 wherein $n$ is 1 and $m$ is 2.

4. A compound as defined in claim 1 wherein $n$ and $m$ are 2.

5. A compound as defined in claim 2 which is 6,11,12,13-tetrahydro-3-methoxy-5-methyl-5,12-methano-5H-dibenzo-[a,e]cyclononen-14-amine.

6. A compound as defined in claim 2 which is 6,11,12,13-tetrahydro-b 3-methoxy-5α-methyl-5,12-methano-5H-dibenzo-[a,e]cyclononen-14β-amine.

7. A compound as defined in claim 2 which is 14β-amino-6,11,12,13-tetrahydro-5α-methyl-5,12-methano-5H-dibenzo-[a,e]cyclononen-3-ol.

8. A compound as defined in claim 2 which is 6,11,12,13-tetrahydro-3-methoxy-5α-methyl-5,12-methano-5H-dibenzo-[a,e]cyclononen-14α-amine.

9. A compound as defined in claim 2 which is 6,11,12,13-tetrahydro-3-methoxy-5-ethyl-5,12-methano-5H-dibenzo-[a,e]cyclononen-14-amine.

* * * * *